3,287,478
METHOD OF SINTERING ALUMINUM NITRIDE REFRACTORIES

Michael S. Pallen and George T. Poglud, Milwaukee, Wis., assignors to Allis-Chalmers Manufacturing Company, Milwaukee, Wis.
No Drawing. Filed Oct. 30, 1964, Ser. No. 407,848
14 Claims. (Cl. 264—63)

This is a continuation-in-part of application Serial No. 289,756, filed June 21, 1963.

This invention relates generally to a method for sintering refractory powders. More particularly, this invention relates to a new and improved method for sintering powdered bodies of aluminum nitride and aluminum nitride-silicon carbide solid solutions for the purpose of making refractory bodies such as crucibles, fire bricks and the like.

Aluminum nitride has been shown to be an excellent refractory material. Of its properties, probably the most important is its excellent resistance to molten metals and molten cryolite at temperatures up to 2000° C. Indeed, aluminum nitride is the only effective refractory for molten aluminum at temperatures in excess of 1500° C. Aluminum nitride is also characterized by its good thermal shock resistance, good strength and excellent resistance to most chemicals.

Aluminum nitride-silicon carbide solid solution has been described as another extremely useful refractory. This solid solution having dispersed silicon carbide in a structure of aluminum nitride, has been shown to be an excellent refractory for withstanding molten aluminum at temperatures in excess of 1500° C. under high vacuum conditions, and for withstanding molten ferrous alloys for extensive lengths of time.

Aluminum nitride and the solid solution of aluminum nitride-silicon carbide however, have been found to be extremely difficult to sinter or fabricate into solid refractory bodies without introducing undesirable additives. Only two successful procedures for sintering aluminum nitride have been reported. By one method reported in Materials in Design Engineering, June 1959, page 170, powdered metallic aluminum and a nonaqueous organic agglomerating agent are reacted with aluminum nitride powder at 2600° F., and the bodies then pressed under a pressure of 2 or 3 t.s.i. and at a temperature of 180° F., and subsequently hardened in an oxidizing atmosphere and then fired in a nitrogen atmosphere. The other known method, reported by George Long and C. M. Foster in the Journal of The American Ceramic Society, vol. 42, No. 2, February 1959, page 53, depends upon hydrostatically pressing the powder of aluminum nitride with pressure up to 75,000 p.s.i. and then firing the body carefully in an argon atmosphere at temperatures of from 1950 to 2050° C. It is apparent that these procedures are somewhat cumbersome, time consuming and more expensive than would be desired for commercial use. Furthermore, these methods seriously limit the size of the object that can be produced as well as the potential purity of the body.

This invention is predicated upon our discovery that aluminum nitride and solid solutions of aluminum nitride-silicon carbide powders can be easily sintered without hydrostatic pressing and without introducing undesirable additives if a small quantity of water is added to the dry powder form before initiating a simple sintering procedure. Through some unexplainable mechanism, the water causes the resulting sintered body to be hard, relatively dense and strongly bonded. Thus no contamination by foreign binders results, and no expensive and size limiting hydrostatic pressing need be employed.

Accordingly, it is an object of this invention to provide a new and improved method for sintering pressed or extruded shapes of aluminum nitride powders and solid solution powders of aluminum nitride-silicon carbide.

It is another object of this invention to provide a cheap commercial method for sintering aluminum nitride powders and solid solution powders of aluminum nitride-silicon carbide.

It is still another object of this invention to provide a simplified method for sintering aluminum nitride powder and solid solution powders of aluminum nitride-silicon carbide which avoids the use of hydrostatic pressing.

It is still a further object of this invention to provide a simplified method for producing high purity sintered refractory bodies of aluminum nitride powders and solid solution powders of aluminum nitride-silicon carbide which avoids the use of contaminating binders.

These and other objects and advantages are fulfilled by this invention to an unexpected extent as will become apparent from an understanding of the following detailed description.

One practice of our invention as it may be performed shall now be described.

First, of course, it is necessary that aluminum nitride be produced in powder form. There are several known methods for producing aluminum nitride, and any of these methods should be sufficient. For refractory purposes at temperatures in excess of 1500° C., however, and especially where the refractory is to be used against molten aluminum, it is desirable that a process be used which produces the aluminum nitride in higher purity.

On the other hand, a solid solution of aluminum nitride-silicon carbide may be more desirable for different refractory applications. In this case the solid solution may be produced by reacting together aluminum oxide, silicon and a solid carbonaceous material in a nitrogen atmosphere at a temperature of from 1200 to 2400° C.

For either refractory, the exact grain size of the powder is not material. For all applications, the fine powders as produced by either of the above mentioned processes, being at a minus 200 mesh are quite satisfactory without further grinding.

To commence the sintering operation the refractory powders are first formed into the desired shape as bricks, crucibles, tubes and so on. The method used in forming these bodies is not material, so that any conventional technique may be employed, as for example mechanical cold pressing, slip casting and the like.

In most cases however, especially where noncompact shapes are desired, such as crucibles and tubes, it will usually be necessary that a temporary binder be used as natural or synthetic gum, molasses or any other temporary organic binder, so that the form may retain its shape during preliminary handling and heating. By temporary is meant a binder which will burn out completely upon heating leaving the sintered body uncontaminated. Since such binders are rather large in number and well known to those skilled in the art, they need not be listed here. Published examples of such binders may be found in Ceramic Age, Jan.-Feb. (1960), "Organic Binders for Ceramic Systems" by Sidney Levine. These binders however, are necessary only for the purpose of providing a mechanical bond to prevent the shaped form from crumbling prior to sintering and in no way aids in the sintering procedure. Thus some simple shapes may not need binders when they can be handled prior to sintering without being destroyed.

Before the shaped form can be sintered, it is necessary that the form contain a rather small amount of water. One method of supply this water is to mix it into the refractory powder before the powder is molded into the desired form. The quantity of water used is not exactingly critical, but it should be kept to a minimum so that the powder is just slightly dampened. More specifically, for such pressed powder forms, anywhere from 2.5 to 20 weight percent water will suffice, with optimum results achieved at from 2.5 to 7 weight percent water. The small amount of water may to some extent act as a binder on the powder, and may eliminate the need for temporary binders in simple compact forms such as pellets and bricks. However, the adhesive qualities of the water are slight and thus water may not be an effective substitute binder in more complex shapes.

Another, and perhaps more effective method for adding the water, is to spray it on after the powder has been molded into the desired shape. To do this the spray must be quite fine so that the molded form is not destroyed. For example the spray mist of a hand atomizer will work quite nicely. When the water is added in this manner, that is sprayed on a premolded form, a smaller amount may be used, namely from about 0.5 to 15 weight percent water with optimum results at about 0.5 to 3 weight percent.

Promptly after the water has been sprayed onto the form, or the form molded with the water as the case may be, the form should be heated to commence sintering. Excessive delay may of course cause some drying in the form and thus would require additional water spraying.

The sintering furnace may be of any conventional type capable of attaining a temperature of 2000° C., and capable of maintaining a controlled atmosphere. During sintering the furnace should be flooded with an inert atmosphere such as nitrogen or argon.

The initial heating to commence sintering should be advanced rather slowly, since if the temperature rises too rapidly the water will come out too fast causing the molded form to crack or break up. A slower heating rate is also desirable for burning out any binder used. Thus as a precautionary measure the initial heating should advance at a rather slow rate. For example, heating from room temperature to a temperature of about 750 to 1000° C. should proceed at a rate of about 500 to 700° C. per hour or over a period of time of from about one and one-half to two hours. Of course it would be possible to use an even slower heating rate in which case the water and binder would be out of the form at a lower temperature. When the binder and water have been burned or driven from the form, heating may be advanced as rapidly as may be desired to the final or ultimate sintering temperature.

The utlimate sintering temperature will vary with the composition of the refractory material being sintered. With pure aluminum nitride and the solid solutions of aluminum nitride-silicon carbide having high concentrations of aluminum nitride, wherein the ratio is on the order of about 15:1 to 20:1 respectively, sintering will proceed at a temperature range of from about 1600 to 2000° C., and ideally at about 1700° C. On the other hand, solid solutions containing higher concentrations of silicon carbide will require slightly higher temperatures. For example, solid solutions having a ratio of about 5:1 to 15:1 will require temperatures of from about 1700 to 2100° C. and solid solutions having a ratio of about 5:1 to 1:1 will require temperatures on the order of about 1800 to 2200° C. As a rule of thumb, the ideal temperature should vary proportionally from about 1700° C. for the 20:1 or 5 percent silicon carbide solid solutions to about 2000° C. for the 1:1 or 50 percent silicon carbide solid solutions. Special attention however, should be directed toward the pure aluminum nitride, the 20:1 and 2:1 solid solutions, since these compositions are those most commonly desired.

The time required to sinter will be dependent upon the ultimate temperature reached in relation to the ideal temperatures listed above. For the pure, or 95 percent (20:1) aluminum nitride sintering at a maximum of 1600° C. will require at least two hours holding time, while at 2000° C., sintering will be complete in about five minutes. The ideal temperature was determined for a desired holding time of one-half hour. Thus at 1700° C., about a one-half hour holding time is necessary. Accordingly, a holding time of from two hours to five minutes will apply to all ranges mentioned above for the higher silicon carbide solid solutions. Thus a one-half hour holding time is necessary at the ideal temperature listed for all compositions.

The temperatures and times discussed above are those which are applicable for sintering in an atmosphere of nitrogen. We have noted however, that when an atmosphere of argon is used, slightly lower temperatures are necessary to achieve any given rate of sintering. The general range of temperatures listed above will still be applicable for argon atmospheres to serve as a guide. Thus when using an argon atmosphere, sintering will start at a slightly lower temperature and proceed at a slightly faster rate at any given temperature. Considering the relative cost of nitrogen and argon, the use of nitrogen is still cheaper despite the slight time saving.

After the refractory body has been sintered at a proper temperature for a proper length of time, it should be furnace cooled in the protective atmosphere. When cooled, the entire surface of the body will be covered with a thin layer of unsintered powder which may be easily wiped or blown from the object. The sintered body underneath will be hard, strong, well bonded and will possess about 60 percent of its theoretical maximum density.

To study the nature of the bond, bars of aluminum nitride were sintered in accordance with this teaching. Square wafers having parallel faces were cut from the bars and subjected to a load until they were broken. The table below shows the results of the tests as well as the density for each wafer. The average fracture loading was well over 7000 p.s.i.

TABLE.—BREAKING TEST ON WAFERS OF SINTERED AlN

| No. | Width, in. | Thickness, in. | Temp., °F. | Density, gm./cc. | P.s.i. to Break |
|---|---|---|---|---|---|
| 1 | .290 | .111 | RT | 1.88 | 8,880 |
| 2 | .289 | .112 | RT | 1.91 | 7,350 |
| 3 | .286 | .112 | RT | 1.86 | 10,000 |
| 4 | .287 | .115 | RT | 2.00 | 9,700 |
| 5 | .288 | .112 | RT | 1.91 | 9,400 |
| 6 | .283 | .109 | 500 | 1.95 | 9,534 |
| 7 | .286 | .109 | 500 | 1.95 | 6,050 |
| 8 | .289 | .109 | 500 | 1.89 | 9,250 |
| 9 | .289 | .115 | 500 | 1.99 | 12,300 |
| 10 | .282 | .110 | 500 | 1.90 | 8,750 |
| 11 | .283 | .107 | 1,000 | 1.93 | 9,112 |
| 12 | .284 | .115 | 1,000 | 1.99 | 8,834 |
| 13 | .283 | .111 | 1,000 | 1.91 | 9,223 |
| 14 | .285 | .115 | 1,000 | 1.98 | 8,423 |
| 15 | .283 | .110 | 1,000 | 1.89 | 9,345 |
| 16 | .285 | .115 | 1,500 | 1.98 | 8,945 |
| 17 | .283 | .110 | 1,500 | 1.97 | 7,778 |
| 18 | .284 | .107 | 1,500 | 1.97 | 7,300 |
| 19 | .283 | .109 | 1,500 | 1.93 | 8,223 |
| 20 | .284 | .109 | 1,500 | 1.74 | 7,778 |

Refractory tests were also conducted on crucibles produced in accordance with this teaching. These crucibles contained molten aluminum, cryolite, iron, copper, brass and other such metals for a period of five hours without any measurable reaction between the molten metal and the crucibles. In fact the only molten metal found to adversely affect the crucibles was molten titanium.

To aid in a fuller understanding of our invention, the following examples are presented, and are meant only to be illustrative.

*Example 1*

Crucibles of AlN were formed by mechanical pressing using mogul gum as a binder. These crucibles were then hydrostatistically pressed at 32,000 p.s.i. Thereafter these crucibles were sintered in $N_2$ at 2000° for one hour.

Upon removal the samples were *not* sintered. These crucibles were then sprayed with water using a hand atomizer and reheated at 2000° C. for one hour. Upon removal, the crucibles were well sintered.

*Example II*

Two crucibles of A1N were extruded using mogul gum as a binder. One crucible was hydrostatically pressed at 160,000 pounds (32,000 p.s.i.) and the other was not. Both crucibles were then sprayed with water using a hand atomized and heated slowely to 2000° C. and held there for a period of one hour. The crucibles were then furnace cooled and upon removal, both appeared to be equally sintered. Thus it was shown that hyrostatic pressing was not necessary.

*Example III*

Powdered AlN:SIC (20:1) was mixed with a small amount of water in a mortar and pestel without the use of an extra binder. The mixture was inserted into a crucible die and pressed with approximately 900 p.s.i. The form was then induction heated in an atmosphere of nitrogen to about 2000° C. and there held for one hour. Upon removal, the crucible was well sintered.

*Example IV*

Powdered AlN:Sic (2:1) was formed into a crucible by extrusion using a gum binder. The crucible was heated to 500° F. and then held for eight hours to burn out the binder. The crucible was then cooled and sprayed with water using a hand atomizer and heated slowly in a nitrogen atmosphere to red heat. Thereafter, it was heated rapidly to 1900° C. and there held for about one-half hour. After furnace cooling the crucible was examined and found to be well sintered.

The embodiments of the invention in which an exclusive property or privilge is claimed are defined as follows:

1. The method of producing refractory bodies comprising the steps of:
   (a) producing a pressed form of the refractory body desired from powders selected from the group consisting of aluminum nitride and solid solution of aluminum nitride-silicon carbide and containing from 2.5 to 20 weight percent water;
   (b) heating said body slowly in an inert atmosphere, until the water has been driven from said body;
   (c) further heating said body in said inert atmosphere to a final temperature in the range of from about 1600 to 2200° C;
   (d) maintaining said final temperature for a period of from five mintues to two hours;
   (e) cooling said body; and
   (f) removing a thin layer of powder which remains on the surface of the body after sintering.

2. The method of producing refractory bodies comprising the steps of:
   (a) producing a molded form of the refractory body desired from powders selected from the group consisting of aluminum nitride and solid solution of aluminum nitride-silicon carbide and containing from 0.5 to 15 weight percent water;
   (b) heating said body slowly in an inert atmosphere, until the water has been driven from said body;
   (c) further heating said body in said inert atmosphere to a final temperature in the range of from about 1600 to 2200° C.;
   (d) maintaining said final temperature for a period of from five minutes to two hours;
   (e) cooling said body; and
   (f) removing a thin layer of powder which remains on the surface of the body after sintering.

3. The method producing of refractory bodies comprising the steps of:
   (a) forming the desired body from a powder selected from the group consisting of pure aluminum nitride and solid solutions of aluminum nitride-silicon carbide having a nitride to carbide ratio of from about 15:1 to 20:1, said powders in said body being moistened with from 0.5 to 7 weight percent water;
   (b) heating said body slowly in an inert atmosphere until said water has been driven from said body;
   (c) further heating said body in said inert atmosphere to a final temperature in the range of from about 1600 to 2000° C.;
   (d) maintaining said final temperature for a period of from about five minutes to two hours;
   (e) cooling said body in said inert atmosphere; and
   (f) removing a thin layer of powder which remains on the surface of the body after sintering.

4. The method of claim 3 wherein a temporary binder is mixed into said powder before the body is formed.

5. The method of producing refractory bodies comprising the steps of:
   (a) forming the desired body from aluminum nitride-silicon carbide solid solution powder having a nitride to carbide ratio of from about 5:1 to 15:1, said powders in said body being moistened with from 0.5 to 7 weight percent water;
   (b) heating said body slowly in an inert atmosphere until said water has been driven from said body;
   (c) further heating said body in said inert atmosphere to a final temperature in the range of from about 1700 to 2100° C.;
   (d) maintaining said final temperature for a period of from about five minutes to two hours;
   (e) cooling said body in said inert atmosphere; and
   (f) removing a thin layer of powder which remains on the surface of the body after sintering.

6. The method of claim 5 wherein a temporary binder is mixed into said powder before the body is formed.

7. The method of producing refractory bodies comprising the steps of:
   (a) forming the desired body from aluminum nitride-silicon carbide solid solution powder having a nitride to carbide ratio of from about 1:1 to 5:1, said powders in said body being moistened with from 0.5 to 7 weight percent water;
   (b) heating said body slowly in an inert atmosphere until said water has been driven from said body;
   (c) further heating said body in said inert atmosphere to a final temperature in the range of from about 1800 to 2200° C.;
   (d) maintaining said final temperature for a period of from about five minutes to two hours;
   (e) cooling said body in said inert atmosphere; and
   (f) removing a thin layer of powder which remains on the surface of the body after sintering.

8. The method of claim 3 wherein a temporary binder is mixed into said powder before the body is formed.

9. The method of producing refractory bodies comprising the steps of:
   (a) admixing solid solution powders of aluminum nitride-silicon carbide, having a nitride to carbide ratio is about 2:1; with from 2.5 to 7 weight percent water;
   (b) compacting and compressing the mixture to mold the refractory body desired;
   (c) heating said body slowly in an inert atmosphere, at a rate of about 500° C. per hour, until a temperature of 750 to 1000° C. is obtained;
   (d) further heating said body in the inert atmosphere to a final temperature of about 2000° C.;
   (e) maintaining said final temperature for a period of about one-half hour;
   (f) cooling said body; and
   (g) removing a thin layer of powder which remains on the surface of the body after sintering.

10. The method of claim 9 wherein a temporary binder is admixed with the said powder-water mixture.

11. The method of producing refractory bodies comprising the steps of:
(a) molding the desired body from powders selected from the group consisting of aluminum nitride and a solid solution of aluminum nitride and silicon carbide;
(b) spraying from 0.5 to 3 weight percent water onto the extruded body;
(c) heating said body slowly in an inert atmosphere, at a rate of about 500° C. per hour, until a temperature of 750 to 1000° C. is obtained;
(d) further heating said body in the inert atmosphere to a final temperature of about 1600 to 2200° C.;
(e) maintaining said final temperature for a period of about one-half hour;
(f) cooling said body; and
(g) removing a thin layer of powder which remains on the surface of the body after sintering.

12. The method of producing refractory bodies comprising the steps of:
(a) admixing from 2.5 to 7 weight percent water with a powder of at least 95 percent pure aluminum nitride;
(b) compacting and compressing the mixture to mold the refractory body desired;
(c) heating said body slowly in an inert atmosphere, at a rate of about 500° C. per hour, until a temperature of about 750 to 1000° C. is obtained;
(d) further heating said body in an inert atmosphere to a final temperature of about 1800° C.;
(e) maintaining said final temperature for a period of about one-half hour;
(f) cooling said body; and
(g) removing a thin layer of powder which remains on the surface of the body after sintering.

13. The method of claim 12 wherein a temporary binder is admixed with the said powder-water mixture.

14. The method of producing refractory bodies comprising the steps of:
(a) molding the desired body from a powder comprising at least 95% pure aluminum nitride;
(b) spraying from 0.5 to 3 weight percent water onto the said body;
(c) heating said body slowly in an inert atmosphere, at a rate of about 500° C. per hour, until a temperature of about 750 to 1000° C. is obtained;
(d) further heating said body in an inert atmosphere to a final temperature of about 1800° C.;
(e) maintaining said final temperature for a period of about one-half hour;
(f) cooling said body; and
(g) removing a thin layer of powder which remains on the surface of the body after sintering.

References Cited by the Examiner

UNITED STATES PATENTS

| | | | |
|---|---|---|---|
| 2,929,126 | 3/1960 | Bollack et al. | 106—65 XR |
| 3,108,887 | 10/1963 | Lenie et al. | 106—62 |
| 3,194,635 | 7/1965 | Lapp et al. | 106—65 XR |

FOREIGN PATENTS

| | | |
|---|---|---|
| 1,328,787 | 4/1963 | France. |
| 1,328,788 | 4/1963 | France. |

ROBERT F. WHITE, *Primary Examiner.*

J. A. FINLAYSON, *Assistant Examiner.*